April 22, 1930.  C. FREDERIKSEN  1,755,777
LANCET
Filed Feb. 12, 1929
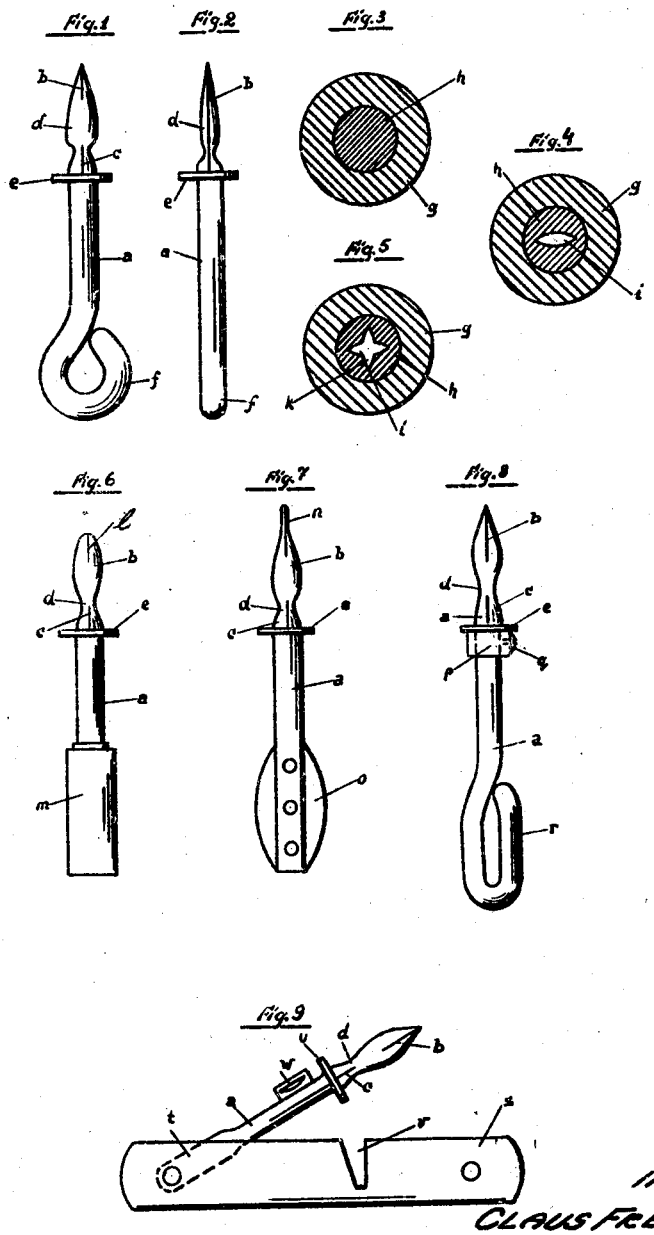
INVENTOR
CLAUS FREDERIKSEN
BY
ATTY.

Patented Apr. 22, 1930

1,755,777

UNITED STATES PATENT OFFICE

CLAUS FREDERIKSEN, OF NORDBORG, DENMARK

LANCET

Application filed February 12, 1929, Serial No. 339,383, and in Germany May 2, 1928.

This invention is directed to a lancet designed particularly for use with the teats of cows to permit a loosening of the cheese-like mass which is, under certain circumstances, deposited in the teats and obstructs the flow of milk.

In some conditions of health, and particularly after hoof and mouth disease, the teats of cows are liable to a cheeselike deposit which seriously obstructs the flow of milk therethrough. Heretofore the removal of this obstruction has required the services of a veterinarian and the elimination of the trouble has proven a source of no little expense.

The primary object of the present invention is the production of an instrument in the form of a lancet capable of being operated by anyone and which will pierce and provide a cruciform incision in the cheese-like mass, tending to a loosening of this mass and its eventual discharge and primarily opening up the obstruction to the flow of milk.

The invention is illustrated in the accompanying drawings, in which:

Figure 1 is a view in front elevation of the improved instrument,

Figure 2 is a side elevation of the same.

Figure 3 is an enlarged sectional view through the teat of a cow showing the accumulated mass therein.

Figure 4 is a similar view showing the incision formed in the mass following the first operation of the instrument.

Figure 5 is a similar view showing the opening formed in the mass following the final operation of the instrument.

Figures 6, 7 and 8 are views in front elevation of modified forms of the instrument.

Figure 9 is a view in elevation showing the instrument provided with a relatively movable handle in which the instrument may be housed when not in use.

In the form illustrated more particularly in Figures 1 and 2, the instrument comprises a rod-like body $a$ having a pointed terminal $d$ of oval form in cross section, the major axis being materially greater than the minor axis and the edges of the pointed terminal of the ends of the major axis being sharpened to a keen cutting edge, indicated at $b$.

Immediately below the point, the rod is reduced in diameter and below the reduced portion such rod is provided with a disk $e$ arranged at right angles to and projecting beyond the surface of the rod and forming a limit for the insertion of the lancet. It is preferred that the sharpened or cutting edge extend from the extreme point of the tool to the disk $e$, as clearly shown in the drawings.

The terminal of the rod remote from the cutting point is formed to provide a handle portion $f$, preferably by forming a return bend in the rod in the form shown in Figures 1 and 2.

In the form shown in Figure 6, the extreme point of the instrument is rounded as indicated at $l$, and the handle $m$ is in the form of a sleeve-like member of increased diameter.

In the form shown in Figure 7, the piercing point, instead of being conical as in Figures 1 and 2, is elongated, as shown at $n$, and the handle $o$ in this form is of oval configuration and secured to the rod.

In the form shown in Figure 8, the lancet is generally of the configuration shown in Figure 1, except that in this instance the limiting disk $e$ is slidably mounted on the rod $a$ through the medium of a collar $p$, the disk being adjustably held on the rod by a set-screw $q$.

Of course this adjustable form of stop disk is not peculiar to the form shown in Figure 8 but obviously may be used with and is contemplated as a part of the construction of any of the other forms illustrated.

In the form shown in Figure 9, the instrument is of the type illustrated in Figure 1 but is pivoted at $t$ in a handle $s$. In this form, the limiting disk, here indicated at $u$, is of semicircular shape and seats in a notch $v$ when the instrument is closed. A finger member $w$ is connected to the rod $a$ to provide for conveniently opening the instrument when desired. Obviously, in this form the instrument may be substantially housed in the handle $s$ and conveniently carried when not in use.

The cheese-like deposit for which the present instrument is particularly effective is shown as a more or less solid mass at $h$ collecting in the teat indicated at $g$, as shown in Figure 3. On the initial insertion of the instrument, an incision $i$ of elongated oval form is made in and through this mass $h$ whereupon the instrument is withdrawn and reinserted at right angles to its initial position, the latter insertion forming an opening $k$ similar to but at right angles to the opening $i$. A cruciform opening, as indicated in Figure 5, is thus formed in the mass, admitting air and permitting subsequent discharge of the mass but primarily opening a canal through the mass for the flow of milk.

Obviously, after forming the opening the usual canula may be inserted and allowed to remain until all liability of closing up the opening is past.

The instrument as a whole is constructed of metal and is preferably highly finished to avoid any irritation or obstruction, and may be nickel-plated or otherwise finished to any desired extent.

What is claimed to be new is:

An instrument of the lancet type for the loosening of the cheese-like mass in the teats of cows, comprising a rod terminally provided with a double edged blade, the rod inwardly of the point being of reduced diameter, and a limiting disk carried by the rod below the portion of reduced diameter.

In testimony whereof I affix my signature.

CLAUS FREDERIKSEN. [L. S.]